June 21, 1932.  F. E. FISHER  1,863,567
ELECTRICAL STEERING DEVICE
Filed June 6, 1931   2 Sheets-Sheet 1

INVENTOR
Frank E. Fisher,
BY
ATTORNEYS

June 21, 1932. F. E. FISHER 1,863,567
ELECTRICAL STEERING DEVICE
Filed June 6, 1931 2 Sheets-Sheet 2
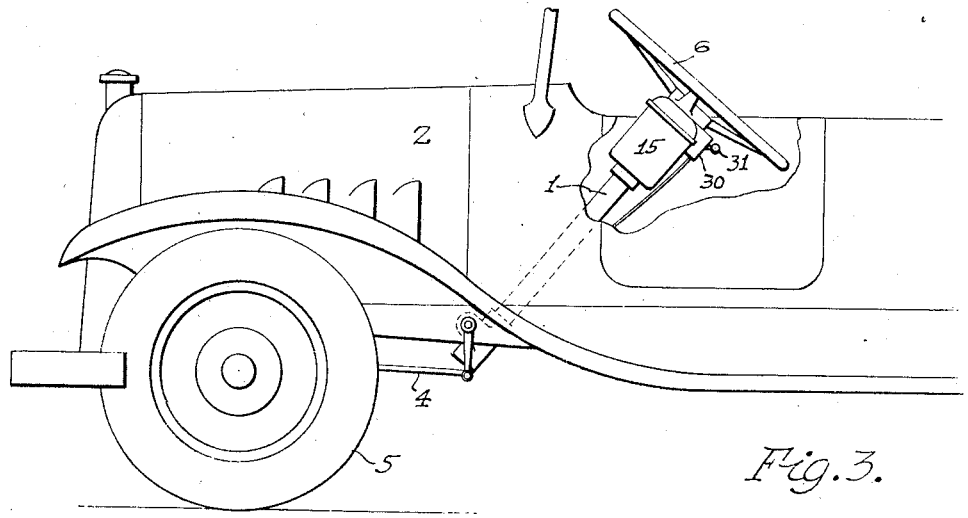
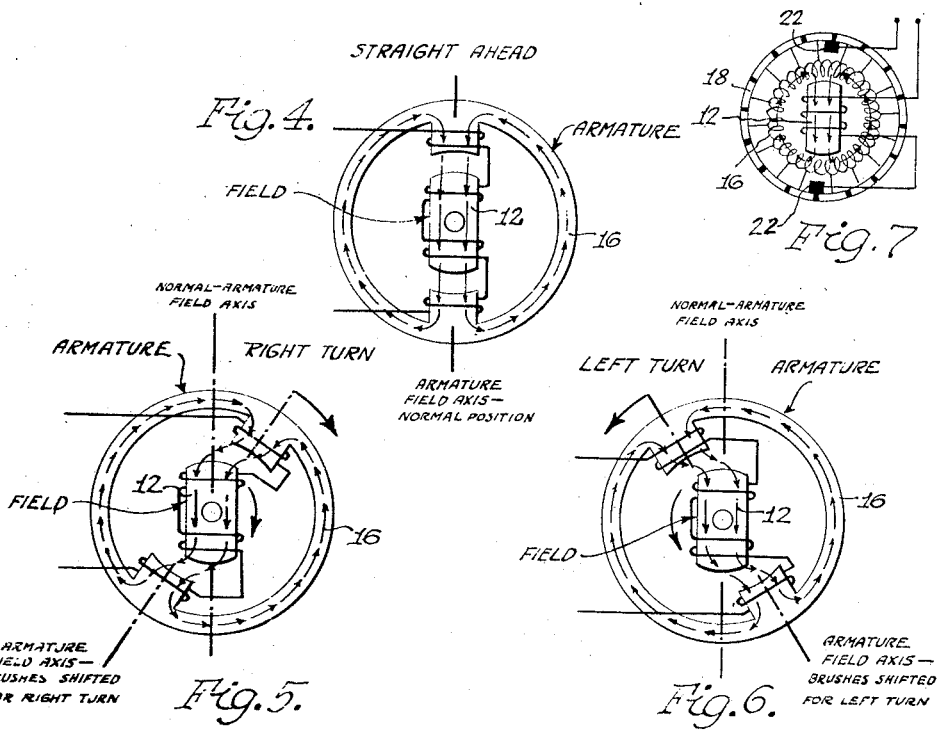
INVENTOR
Frank E. Fisher,
BY
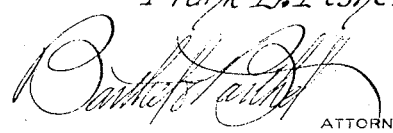
ATTORNEYS Patented June 21, 1932

1,863,567

UNITED STATES PATENT OFFICE

FRANK E. FISHER, OF DETROIT, MICHIGAN

ELECTRICAL STEERING DEVICE

Application filed June 6, 1931. Serial No. 542,634.

The present invention pertains to a novel electrical steering device designed particularly for motor vehicles where a great effort is ordinarily required to deflect the front wheels as in the case of trucks and heavy passenger cars.

The principal object of the invention is to provide a device of this character wherein the steering wheel turns free on the steering shaft but through an electrical apparatus transmits a corresponding rotation to the shaft. The electrical apparatus consists preferably of a direct current motor having its field mounted on the shaft and its armature fixedly surrounding the field. The commutator is also fixed, and the brushes are carried by the steering wheel. The normal position of the brushes with respect to the commutator is such that the field set up in the armature is co-axial with the field winding, so that there is no motion in the motor. When however the wheel is turned, the axis of the field in the armature is changed, and the field winding secured to the steering shaft is attracted to a position where it is again coaxial with the field in the armature. By reason of this arrangement, the steering shaft is caused to follow the movements of the steering wheel.

Another object of the invention is to provide a means whereby the steering shaft may be turned manually in the usual manner if desired. The electrical circuit includes an electro-magnetic lock which normally locks the steering wheel to the steering shaft under the action of a spring. The position of this lock is such that it becomes disengaged on completion of the circuit through a manual switch so that the wheel is mechanically disconnected from the shaft on closing of the motor circuit.

The invention is fully disclosed by way of example in the following description and in the accompanying drawings in which—

Fig. 3 is a side elevation of a motor vehicle equipped with a steering device according to the invention;

Figs. 4, 5 and 6 are diagrammatic views showing different relative positions of the field winding and armature; and Fig. 7 is a wiring diagram of the armature, commutator and brushes.

Reference to these views will now be made by use of like characters which are employed to designate corresponding parts throughout.

Figure 2:
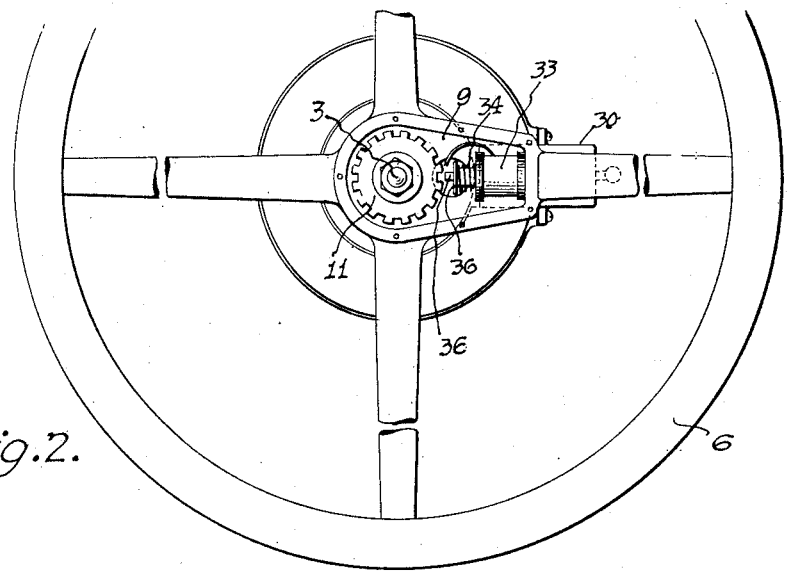
Fig. 2 is a plan view with the cover plate removed.
Figure 1:
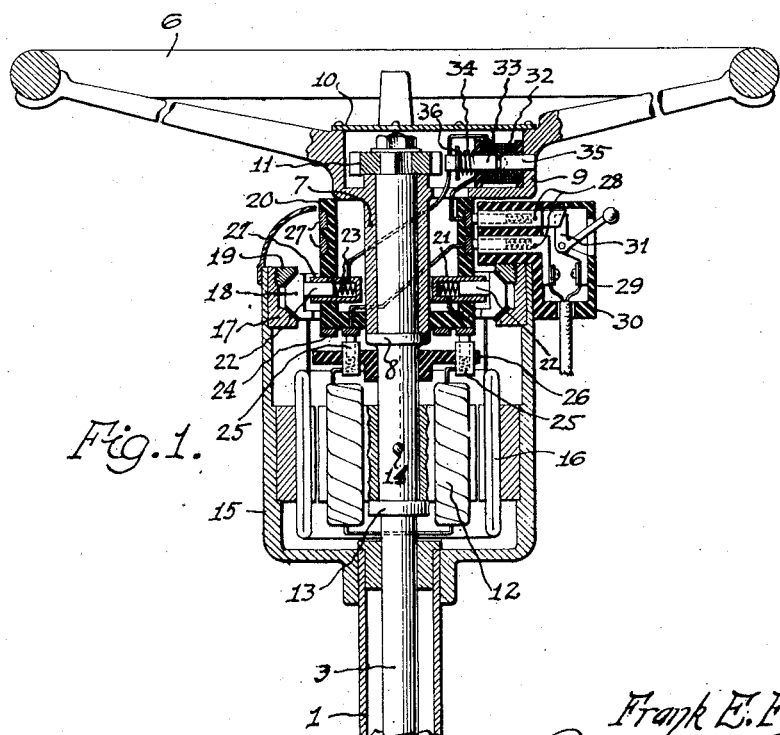
Figure 1 is a vertical section of the device.

In Figure 1 is illustrated a fixed steering column 1 mounted in the motor vehicle 2 in the usual manner, as shown in Fig. 3. Within the column is journalled a steering shaft 3 linked as at 4 to the front wheels 5 also in the usual manner. Upon the upper end of the shaft 3 is mounted a steering wheel 6 having a sleeve 7 which may turn on the shaft and which is supported on a collar 8 formed on the shaft. In this respect the device of the invention differs from the usual construction wherein the steering wheel is permanently fixed to the steering shaft. The center of the wheel is formed with a cavity 9 normally closed by a detachable cover plate 10. The shaft 3 extends into this cavity and has a ratchet 11 mounted on its upper end for a purpose which will presently appear.

The shaft is surrounded by the field winding 12 of a direct current motor. This winding is supported by a collar 13 formed on the shaft and is secured to the shaft by a pin 14. The field winding is enclosed in a housing 15 suitably fixed to the steering column 1 as shown more clearly in Fig. 1. The housing carries a fixed armature of the drum type consisting of conductors 16 as shown in Fig. 7.

In the upper portion of the housing is secured a supporting ring 17 of angular cross section on which are mounted the commutator bars or segments 18 for the conductors 16. The bars are fixed to the ring and hence to the fixed housing 15 by means of a locking or clamping ring 19 screwed into the ring 17.

The steering wheel carries an insulating member 20 preferably of cylindrical or thimble shape and attached to the sleeve 7 and depressed portion 9 of the wheel. This member carries a pair of opposed guides 21 containing diametrically opposed brushes 22 which are held in engagement with the commutator by springs 23. Contact rings 24 are mounted on the bottom of the member 20 and engage respectively with spring contacts 25 mounted in an insulated supporting plate 26 and connected to the ends of the field winding 12. Two ring contacts 27 are also mounted in the cylindrical wall of the member 20 and engaged respectively with spring contacts 28 mounted in a switch box 29 carried by the fixed housing 15. Conductors 30 leading from any suitable source of current, such as the battery on the motor vehicle, connect with the contacts 28, and a toggle switch 31 constitutes the connecting means between one of the conductors 30 and its contact 28.

In the cavity 9 is also mounted a solenoid 32 having a plunger or armature 33 in the form of a locking pin adapted to cooperate with the ratchet 11 in locking the wheel 6 to the shaft 2. Moreover, the plunger is normally held in locking position by a spring 34 but is retracted from the ratchet when current flows in the solenoid through the circuit presently to be described. A stop 35 in the solenoid limits the retractile movement of the plunger.

The circuit is completed by a conductor 36 which extends from one of the rings 27 to the solenoid 32, to one of the brushes 22 and commutator bar 18, to one of the armature windings 16, to the opposite winding 16 and connected commutator bar 18, to the remaining brush 22, to the outer contact ring 24, through the field winding 21 to the inner ring 24 and thence to the remaining contact ring 27. The circuit is obviously controlled by the switch 31 which, when closed, withdraws the plunger 33 from the ratchet 11, permitting the field 6 to turn relatively to the shaft 2.

Normally the field set up in the armature is coaxial with the field winding 12, as shown in Fig. 4. Turning of the steering wheel 6 in either direction changes the plane of flux through the armature, by the movement of the brushes 22 relatively to the commutator bars 18, whereupon a torque is set up between the armature and field as shown in Figs. 5 and 6. The result of this torque is that the field is turned until it is again coaxial with the field set up in the armature. The turning of the field winding obviously turns the shaft 3 in the same direction in which the wheel 6 was previously turned, so that the front wheels 5 are deflected by actuation of the wheel 6 as in ordinary steering.

When it is not desired to use the electrical steering gear, it is only necessary to open the switch 31, whereupon the current ceases to flow through the circuit previously outlined. The solenoid 32 is thereby rendered inoperative, and the spring 34 moves the plunger 33 into locking engagement with the ratchet 11 to lock the wheel 6 directly to the shaft 2. The front wheels 5 are then turned manually through the wheel 6 and shaft 2 in the usual manner.

Although a specific embodiment of the invention has been illustrated and described, it will be apparent that various alterations in the details of construction may be made without departing from the scope of the invention as indicated by the appended claims.

What I claim is:

1. A steering device comprising a steering shaft, a steering wheel rotatable on said shaft, a field winding carried by said shaft, a fixed housing surrounding said shaft, an armature carried by said housing and surrounding said field winding, a commutator for said armature, brushes rotatable with said wheel and engaging said commutator, and an electrical circuit including said brushes, commutator, armature and field winding.

2. A steering device comprising a steering shaft, a steering wheel rotatable on said shaft, a field winding carried by said shaft, a fixed housing surrounding said shaft, an armature carried by said housing and surrounding said field winding, a commutator for said armature, an insulating member carried by said wheel, brushes mounted in said member and engaging said commutator, and an electrical circuit including said brushes, commutator, armature and field winding.

3. A steering device comprising a steering shaft, a steering wheel rotatable on said shaft, a field winding carried by said shaft, a fixed housing surrounding said shaft, an armature carried by said housing and surrounding said field winding, a commutator for said armature, brushes rotatable with said wheel and engaging said commutator, ring contacts carried by said member, lead-in contacts carried by said housing and engaging said ring contacts, and an electrical circuit including said contacts, brushes, armature and field winding.

4. A steering device comprising a steering shaft, a steering wheel rotatable on said shaft, a field winding carried by said shaft, a fixed housing surrounding said shaft, an armature carried by said housing and surrounding said field winding, a commutator for said armature, brushes rotatable with said wheel and engaging said commutator, an electrical circuit including said brushes, commutator, armature and field winding, a lock normally locking said wheel to said shaft, and an electro-magnetic device included in said circuit for releasing said lock.

5. A steering device comprising a steering shaft, a steering wheel rotatable on said shaft, a field winding carried by said shaft, a fixed housing surrounding said shaft, an armature carried by said housing and surrounding said field winding, a commutator for said armature, brushes rotatable with said wheel and engaging said commutator, an electrical circuit including said brushes, commutator, armature and field winding, a switch in said circuit, a lock normally locking said wheel to said shaft, and an electromagnetic device included in said circuit for releasing said lock on closing of said switch.

6. A steering device comprising a steering shaft, a steering wheel rotatable on said shaft, a field winding carried by said shaft, a fixed housing surrounding said shaft, an armature carried by said housing and surrounding said field winding, a commutator for said armature, brushes rotatable with said wheel and engaging said commutator, an electrical circuit including said brushes, commutator, armature and field winding, a switch in said circuit, a ratchet on said shaft, a plunger carried by said wheel and normally held in locking engagement with said ratchet, and a solenoid in said circuit surrounding said plunger and adapted to withdraw the same from said ratchet on closing of said switch.

7. A steering device comprising a steering shaft, a steering wheel rotatable on said shaft, a field winding carried by said shaft, a fixed housing surrounding said shaft, a drum wound armature carried by said housing and surrounding said field winding, a commutator for said armature, brushes rotatable with said wheel and engaging said commutator, and an electrical circuit including said brushes, commutator, armature and field winding.

8. A steering device comprising a steering shaft, a steering wheel rotatable on said shaft, a field winding carried by said shaft, a fixed housing surrounding said shaft, an armature carried by said housing and surrounding said field winding, a commutator for said armature, brushes rotatable with said wheel and engaging said commutator, and an electrical circuit including said brushes, commutator, armature and field winding, said brushes being normally positioned with respect to said commutator that the field in the armature is coaxial with the field winding.

In testimony whereof I affix my signature.

FRANK E. FISHER.